J. J. McDONALD.
WRITING BOARD.
APPLICATION FILED JAN. 28, 1918.
1,284,118.
Patented Nov. 5, 1918.
2 SHEETS—SHEET 1.
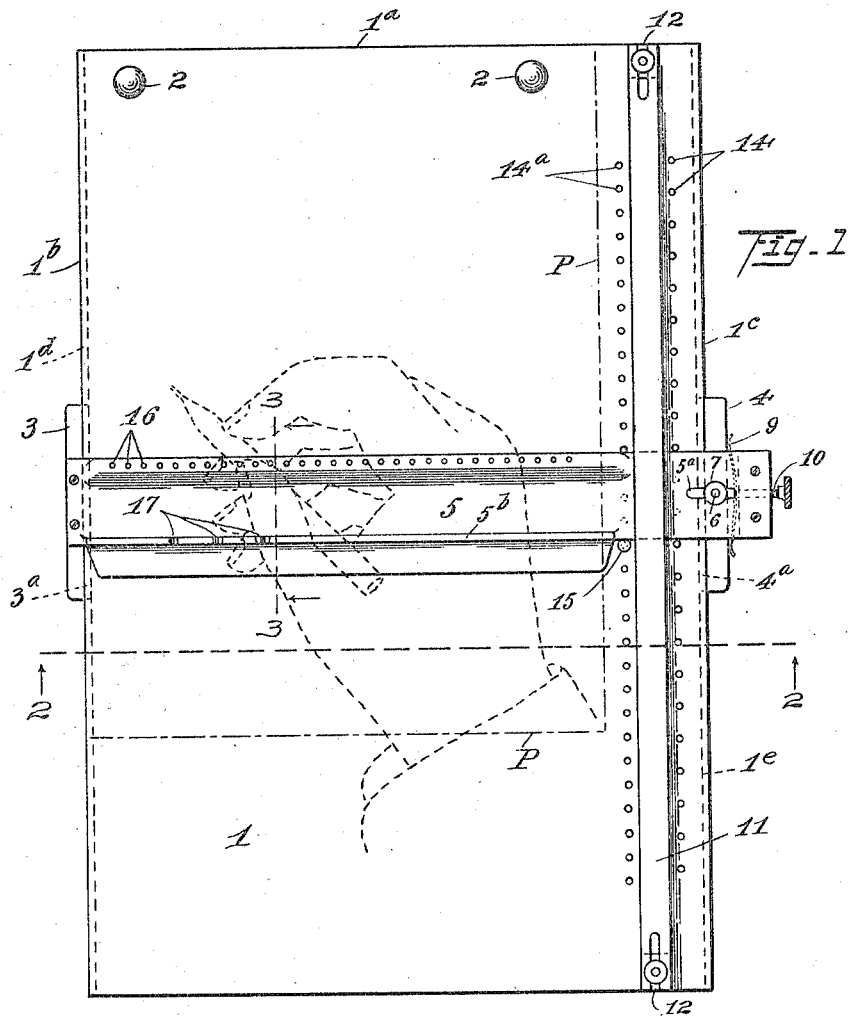
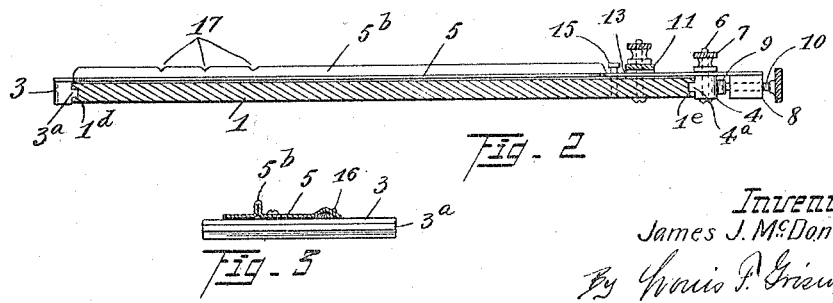
Inventor
James J. McDonald J. J. McDONALD.
WRITING BOARD.
APPLICATION FILED JAN. 28, 1918.
1,284,118.
Patented Nov. 5, 1918.
2 SHEETS—SHEET 2.
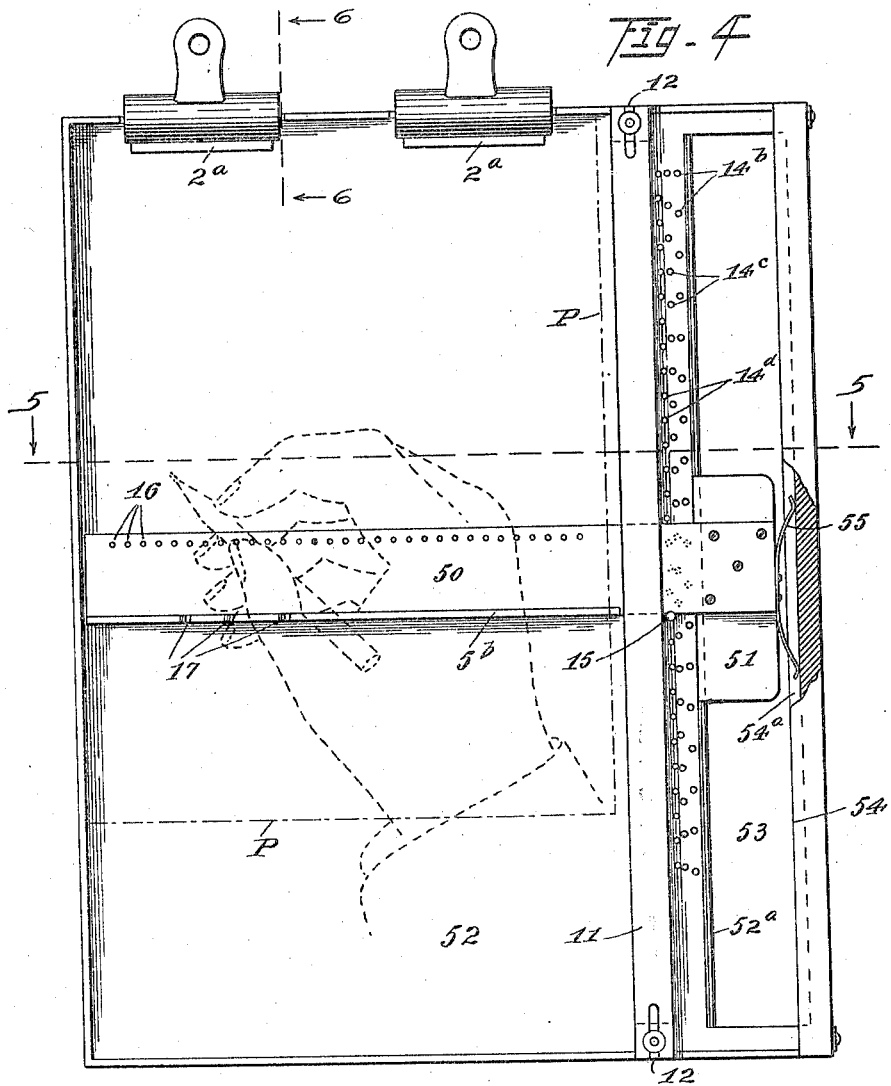
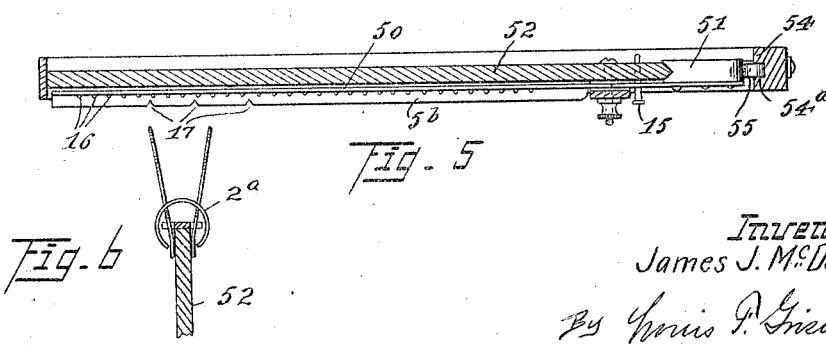
Inventor
James J. McDonald

UNITED STATES PATENT OFFICE.

JAMES J. McDONALD, OF CLEVELAND, OHIO.

WRITING-BOARD.

1,284,118.　　　　　Specification of Letters Patent.　　Patented Nov. 5, 1918.

Application filed January 28, 1918.　Serial No. 214,229.

*To all whom it may concern:*

Be it known that I, JAMES J. McDONALD, a citizen of the United States, residing at Cleveland, in the county of Cuyahoga and State of Ohio, have invented certain new and useful Improvements in Writing-Boards, of which the following is a specification.

This invention relates in general to a commodious device for use in manuscript or letter writing, and more particularly to a writing board adapted for use by blind people in writing letters. Being one of the unfortunate sightless individuals myself, and being able to write before I became afflicted, I have found that the loss of my sight has not deprived me of the ability to write words or construct lines of words legibly, but I am unable, like all others thus afflicted, to space the lines properly, or to know where to begin and end the succeeding lines of a letter or manuscript, so that it presents a neat and legible document as a whole.

A sightless person may easily write one line of a document straight and with the words fairly well spaced, but he is at a loss to know where to begin the succeeding line or to keep it parallel with the preceding line. This is particularly true if the writer's attention is diverted from his work for any reason. He is liable to run into or write entirely over what he has written before. With people who are able to see, the sense of sight guides the hand that does the writing, but being deprived of sight as a guiding medium it is advantageous to provide for some other guiding means that is dependable upon the unimpaired senses. Heretofore as far as I have been able to ascertain there has not been provided any device that has proved satisfactory for the purpose set forth.

The primary object of the present invention is the provision of a device embodying means for guiding the hand in letter writing, by the sense of feeling, this sense being usually very acute with the sightless. The improvement includes guide means for spacing the lines and keeping them horizontal and parallel. It also provides for spacing the words in a line, and for spacing the margin properly for the address and for starting of paragraphs.

A further object of the invention is to provide a device for the purpose set forth, that is easy of adjustment, not dependable upon the sense of sight. A device that is simple and durable, and economical to manufacture.

With these objects in view the invention consists broadly of a light, flat board member adapted to support the paper to be written on, suitable means being provided for removably attaching the paper to the board, and a hand rest substantially in the form of a T square that lies horizontally across the face of the paper. The said hand rest has a sliding movement guided by the lateral edge or edges of the board, and provided with finger guides and adjustable stops for line and word spacing purposes.

In the accompanying drawings which are made a part of the specification, two embodiments of the improvement are illustrated, and while the detailed construction of the two devices differs, the spirit of the invention is carried out in both, and it will be understood that there may be other modifications in detail without departing from the nature of the invention, limitation being governed by the scope of the appended claims.

In the said drawings Figure 1 is a plan view of one embodiment of the invention.

Fig. 2 is a section on line 2—2 of Fig. 1, and Fig. 3 is a sectional view on line 3—3 of Fig. 1.

Fig. 4 is a plan view illustrating a modified construction. Fig. 5 is a section on line 5—5 of Fig. 4, which being projected from Fig. 4 may make the view appear erroneous. It will however be made clear from the description that the hand rest is on the top face of the board. Fig. 6 is a section on line 6—6 of Fig. 4.

Throughout the several figures of the drawings and in the description, similar characters of reference are employed to designate corresponding parts.

Referring first particularly to Figs. 1, 2 and 3, the primary element of the device is a member, which for convenience of explanation will be designated as the body or supporting board 1. This board is made of suitable light weight material, preferably wood, rectangular in general contour and of non-cumbersome dimensions but sufficient to conveniently accommodate the writing paper, and the guiding attachments which are elements of the invention.

The letter or other manuscript paper is indicated by the broken line P, and is removably attached to the face of the body board 1 by any well known means, as thumb-tacks 2 Fig. 1 or by clips 2ª, as shown in Fig. 4. The top edge 1ª and the left lateral edge 1ᵇ of the board 1 form guides for the placement of the paper in proper position on said board.

The lateral edges 1ᵇ and 1ᶜ of the board are provided with longitudinal grooves 1ᵈ and 1ᵉ adapted to accommodate the tongues 3ª and 4ª of members 3 and 4. The members 3 and 4 are right-angle heads connected with a hand rest or guide blade 5 which extends horizontally over the face of the board 1, in practice the paper being interposed between said blade and the board. The head member 3 is rigidly attached to the blade 5 and the member 4 has a yielding connection with said blade through the medium of the screw 6 provided with a nut 7 and operating in a slot 5ª in the blade 5. The blade 5 extends beyond the yielding head 4 and is provided with a stationary head or depending block 8, a spring 9 being interposed between the block 8 and the head member 4. A screw 10 is threaded through the block 8 and bears on the spring 9, and through said spring regulates the sliding friction of the head 4 and tongue 4ª on the edge and in the groove of the board.

A thin strip 11 of suitable material, extending the entire length of the board 1, parallel with the edge thereof, is supported on and removably attached to bolsters 12, thereby forming a longitudinal recess 13 in which the blade 5 slides, thus providing means for retaining the blade flat on the paper.

The blade 5 is provided with a bead or ridge 5ᵇ. With the hand resting on the blade 5 in the natural position for writing, the ridge 5ᵇ is between the tips of the third and fourth fingers and provides an alinement guide as the hand travels horizontally over the blade.

An important factor of efficiency of the improved device is the provision of means for line spacing, and with this end in view, apertures are provided in the board 1. These apertures are arranged in series and in planes parallel with the lateral edges of the board. In the embodiment shown in Figs. 1 and 2 there are two series 14 and 14ª. These two series provide for at least three spacings, assuming that the holes in the series 14 are one-half inch apart, and those in series 14ª three-eighths of an inch apart. This will be brought out more clearly in the further description of the method of line spacing.

A pin 15 is adapted to be inserted in any one of the apertures 14 or 14ª, and provides a bearing or stop for the hand rest 5, thereby governing the line spacing in the following described manner. Assuming that it is desired to space the lines of a manuscript equally three-eighths of an inch apart. The pin 15 is inserted in one of the apertures in series 14ª and the blade 5 brought to rest on said pin. After one line has been written, the hand being guided horizontally by the finger tips following the ridge 5ᵇ, the pin is removed and inserted in the next lower succeeding hole in the series, and the blade brought to rest thereon, this function being repeated after writing each line, to the end of the page to be written. If a three-quarters of an inch line spacing is desired, the pin is moved to the second hole following the writing of each line, and if one-half inch space is desired the pin is used in the same manner in connection with the series 14. These operations can be easily performed by the hands of the operator guided by the sense of feeling.

As a guide for word spacing the blade 5 is provided with a series of horizontally equally spaced small bosses 16, and for paragraph and address spacing, notches 17 are provided in the ridge 5ᵇ. The hand is guided for the purpose set forth, through the feeling sense, by the contact of the fingers with the elements 16 and 17.

In the modification illustrated in Figs. 4, 5 and 6, the hand rest or blade 50 is provided with a rigid right angle head 51, and the board 52 has a slot 53 which provides an out-board bearing member 54. A groove 54ª is provided in the member 54, a spring 55 attached to the head 51 bears in the groove 54ª, thereby retaining the said head in sliding contact with the edge 52ª, preferably an angular tongue and groove contact as shown. In the modification three series 14ᵇ, 14ᶜ and 14ᵈ of line spacing apertures are shown, the function of said apertures and the pin 15 being identical with that hereinbefore described. The blade 50 differs from the blade 5 in minor details of design, but is provided with the salient guiding factors 5ᵇ, 16 and 17, for line and word spacing.

It will readily be seen from the foregoing description that the improved device provides an efficient means for facilitating neat, legible writing without the employment of the sense of sight, the simple adjustments and general operation being dependable on the sense of feeling. It will also be understood that there may be numerous modifications in design, proportions, and details of construction without departure from the spirit of the invention. And while the improved device is particularly serviceable to sightless persons, it is very commodious for letter or manuscript writing in general.

What I claim and desire to secure by Letters Patent is:

1. As an article of manufacture a writing commodity comprising a supporting member for the material to be written on, an adjustable superimposed hand rest adapted to slide on said supporting member, means for guiding said slidable hand rest, stop means for regulating the sliding adjustment of the hand rest, and a horizontal ridge on the hand rest for guiding the fingers of the writer.

2. As an article of manufacture a writing commodity comprising a supporting member to which the material to be written on is removably attached, an adjustable superimposed hand rest slidable on said supporting member, means for retaining and guiding said hand rest in sliding contact with the supporting member, stop means for regulating the sliding adjustment of the hand rest, a horizontal ridge on the hand rest for guiding the fingers of the writer, and horizontal spacing guides on said hand rest, said spacing guides being distinguishable by the sense of feeling.

3. A writing board comprising a plain, flat, rectangular member on the face of which the material to be written upon is removably attached, a horizontally superimposed hand rest on said flat member, a right angle cross head on said hand rest, that slides longitudinally on a lateral edge of the flat member, means for retaining said cross head in sliding contact with the lateral edge, stop means for regulating the sliding adjustment of said hand rest, a horizontal ridge on the hand rest for guiding the fingers of the writer, and scarifications arranged on said hand rest distinguishable by the sense of feeling for horizontal spacing guides.

4. A writing board comprising a plain, flat, rectangular member on the face of which the material to be written upon is removably attached, a horizontally superimposed hand rest on said flat member, a right angle cross head on said hand rest, that slides longitudinally on a lateral edge of the flat member, means for retaining said cross head in sliding contact with the lateral edge, means for retaining the hand rest flat on the paper, stop means for regulating the sliding adjustment of said hand rest, a horizontal ridge on the hand rest for guiding the fingers of the writer, and scarifications arranged on said hand rest distinguishable by the sense of feeling for horizontal spacing guides.

5. A writing board comprising a flat rectangular board member on which the material to be written upon is removably attached, a hand rest provided with a raised horizontal finger guide superimposed on the board, a right angle cross head attached to said guide member and slidable on a lateral edge of the board, means for retaining said cross head in sliding contact with said edge, said board being provided with series of holes in parallel alinement with the lateral edges, and a stop member to be inserted in any one of the holes of said series to regulate the sliding movement of the horizontal guide member.

6. In a writing board the combination of a rectangular body member having a plain flat face; means for removably attaching sheets of paper to said face; a T square the blade of which extends horizontally over the paper when so attached, a ridge on the T square blade provided as a horizontal finger guide, the head of said T square slidable on a lateral edge of the board body; means for retaining the head in sliding contact with said edge; means for retaining the blade flat on the paper; adjustable means for regulating the movement of the T square whereby horizontal parallel line spacing is brought about.

7. In a writing board the combination of a rectangular board body member having a plain flat surface; means for removably attaching sheets of paper to said flat board on the plain surface thereof; a T square the blade of which extends horizontally over the paper when so attached, the head of said T square slidable on a lateral edge of the board body; means for retaining the head in sliding contact with said edge; means for retaining the blade flat on the paper; adjustable means for regulating the movement of the T square whereby horizontal parallel line spacing is brought about; and means on the T square blade adapted to be distinguished by finger touch for guiding word spacing in the horizontal lines.

In testimony whereof I affix my signature.

JAMES J. McDONALD.

Copies of this patent may be obtained for five cents each, by addressing the "Commissioner of Patents, Washington, D. C."